US010584639B2

(12) United States Patent
Dam et al.

(10) Patent No.: US 10,584,639 B2
(45) Date of Patent: Mar. 10, 2020

(54) TORCH IGNITER

(71) Applicant: Woodward, Inc., Fort Collins, CO (US)

(72) Inventors: Bidhan Dam, Fort Collins, CO (US); Jimroy McCormack, Fort Collins, CO (US); Erik Pederson, Fort Collins, CO (US); Fei Philip Lee, Holland, MI (US); Paul Hicks, Jupiter, FL (US)

(73) Assignee: Woodward, Inc., Fort Collins, CO (US)

( * ) Notice: Subject to any disclaimer, the term of this patent is extended or adjusted under 35 U.S.C. 154(b) by 718 days.

(21) Appl. No.: 14/829,045

(22) Filed: Aug. 18, 2015

(65) Prior Publication Data

US 2016/0047318 A1 Feb. 18, 2016

Related U.S. Application Data

(60) Provisional application No. 62/038,708, filed on Aug. 18, 2014.

(51) Int. Cl.
*F02C 7/264* (2006.01)
*F23D 14/64* (2006.01)
(Continued)

(52) U.S. Cl.
CPC ............ *F02C 7/264* (2013.01); *F23D 11/402* (2013.01); *F23D 14/64* (2013.01); *F23Q 7/06* (2013.01)

(58) Field of Classification Search
CPC ...... F23R 3/12; F23R 3/14; F23R 3/20; F23R 3/28; F23R 3/30; F23R 3/32;
(Continued)

(56) References Cited

U.S. PATENT DOCUMENTS 2,864,234 A    12/1958  Seglem et al.
2,974,485 A *   3/1961  Schiefer ................. F23C 99/00
                                                         60/756
(Continued)

FOREIGN PATENT DOCUMENTS

CN         1598406       3/2005
EA      2379859 A1      10/2011
(Continued)

OTHER PUBLICATIONS

International Search Report and Written Opinion issued in International Application No. PCT/US2015/045664 dated Oct. 22, 2015; 11 pages.

(Continued)

*Primary Examiner* — Jason H Duger
(74) *Attorney, Agent, or Firm* — Fish & Richardson P.C.

(57) ABSTRACT

A gas turbine combustor assembly includes a primary combustion chamber in fluid communication with a primary fuel injector and a primary air inlet. A torch igniter is carried by the primary combustion chamber, and includes an auxiliary combustion chamber housing comprising a mixing chamber and a throat region converging downstream of the mixing chamber. An air swirler including a plurality of swirl openings surrounding an outlet of an auxiliary fuel injector is coupled to the auxiliary combustion chamber proximate the mixing chamber. An ignition source projects into the mixing chamber of the auxiliary combustion chamber.

16 Claims, 4 Drawing Sheets

(51) Int. Cl.
  *F23D 11/40* (2006.01)
  *F23Q 7/06* (2006.01)
(58) Field of Classification Search
  CPC .. F23R 2900/00009; F23R 2900/00015; F23R 2900/03343; F02C 7/26; F02C 7/264; F23D 11/402; F23D 14/64; F23D 2207/00; F23Q 7/06; F23N 2027/02
  See application file for complete search history.

(56) References Cited

U.S. PATENT DOCUMENTS

| | | |
|---|---|---|
| 3,297,914 A | 1/1967 | Saintsbury |
| 3,954,389 A | 5/1976 | Szetela |
| 4,141,213 A | 2/1979 | Ross |
| 4,215,979 A | 8/1980 | Morishita |
| 4,246,757 A | 1/1981 | Heberling |
| 4,301,656 A | 11/1981 | Stettler |
| 4,860,533 A | 8/1989 | Joshi |
| 5,085,040 A | 2/1992 | Tilston |
| 5,444,982 A | 8/1995 | Heberling et al. |
| 5,540,056 A | 7/1996 | Heberling et al. |
| 5,590,517 A | 1/1997 | DeFreitas |
| 5,675,971 A | 10/1997 | Angel et al. |
| 5,680,766 A | 10/1997 | Joshi et al. |
| 5,778,676 A | 7/1998 | Joshi et al. |
| 6,182,436 B1 | 2/2001 | Prociw et al. |
| 6,339,923 B1 | 1/2002 | Halila et al. |
| 6,530,223 B1 | 3/2003 | Dodds et al. |
| 6,912,857 B2 | 7/2005 | Schmotolocha et al. |
| 6,983,605 B1 | 1/2006 | Hook et al. |
| 7,299,620 B2 | 11/2007 | Stuttaford et al. |
| 7,775,052 B2 * | 8/2010 | Cornwell ............... F01D 17/02 60/740 |
| 7,913,494 B2 * | 3/2011 | Hiromitsu ............... F23C 7/002 239/399 |
| 8,161,725 B2 | 4/2012 | Yu |
| 8,312,854 B2 | 11/2012 | Weinrotter et al. |
| 8,459,222 B2 | 6/2013 | Weinrotter et al. |
| 8,584,648 B2 | 11/2013 | Chiera et al. |
| 8,707,921 B2 | 4/2014 | Ridderbusch |
| 8,807,107 B2 | 8/2014 | Weinrotter et al. |
| 8,844,491 B2 | 9/2014 | Weinrotter et al. |
| 9,010,292 B2 | 4/2015 | Herden |
| 9,080,772 B2 | 7/2015 | Prociw et al. |
| 9,133,813 B2 | 9/2015 | Kraus et al. |
| 9,200,563 B2 | 12/2015 | Thomassin |
| 2001/0050069 A1 | 12/2001 | Oprea et al. |
| 2002/0002962 A1 | 1/2002 | Ibrahim |
| 2002/0011232 A1 | 1/2002 | Gillis et al. |
| 2002/0026926 A1 | 3/2002 | Loye et al. |
| 2002/0032114 A1 | 3/2002 | Yi et al. |
| 2002/0134345 A1 | 9/2002 | Adams |
| 2002/0134767 A1 | 9/2002 | Brunet et al. |
| 2002/0157559 A1 | 10/2002 | Brunet et al. |
| 2003/0005908 A1 | 1/2003 | Fujieda et al. |
| 2003/0054310 A1 | 3/2003 | Rigazzi |
| 2003/0056749 A1 | 3/2003 | Beckertgis |
| 2003/0062021 A1 | 4/2003 | Najt et al. |
| 2003/0075121 A1 | 4/2003 | Dixon |
| 2003/0110758 A1 | 6/2003 | Adams |
| 2003/0116121 A1 | 6/2003 | Agama et al. |
| 2003/0183192 A1 | 10/2003 | Donauer et al. |
| 2003/0213461 A1 | 11/2003 | Regueiro |
| 2004/0045514 A1 | 3/2004 | Qian et al. |
| 2004/0065293 A1 | 4/2004 | Goto |
| 2004/0107941 A1 | 6/2004 | Goto |
| 2004/0123849 A1 | 7/2004 | Bryant |
| 2004/0144357 A1 | 7/2004 | Adams |
| 2004/0149254 A1 | 8/2004 | Piock |
| 2004/0194753 A1 | 10/2004 | Weickel et al. |
| 2004/0211389 A1 | 10/2004 | DeLisle |
| 2004/0216712 A1 | 11/2004 | Herdin et al. |
| 2004/0226523 A1 | 11/2004 | Kreuter et al. |
| 2004/0237928 A1 | 12/2004 | Sun et al. |
| 2004/0261760 A1 | 12/2004 | Robinet |
| 2005/0000484 A1 | 1/2005 | Schultz et al. |
| 2005/0016495 A1 | 1/2005 | Lampard |
| 2005/0029021 A1 | 2/2005 | Rigazzi |
| 2005/0045600 A1 | 3/2005 | Tatham |
| 2005/0051130 A1 | 3/2005 | Lampard |
| 2005/0087168 A1 | 4/2005 | Hwang |
| 2005/0092285 A1 | 5/2005 | Klonis et al. |
| 2005/0098162 A1 | 5/2005 | Bryant |
| 2005/0103306 A1 | 5/2005 | Izumisawa |
| 2005/0115547 A1 | 6/2005 | Bryant |
| 2005/0126177 A1 | 6/2005 | Primlani |
| 2005/0163696 A1 | 7/2005 | Uhm et al. |
| 2005/0172631 A1 | 8/2005 | Primlani |
| 2005/0172929 A1 | 8/2005 | Strauss |
| 2005/0193987 A1 | 9/2005 | Doering |
| 2005/0205353 A1 | 9/2005 | Chen |
| 2005/0211217 A1 | 9/2005 | Boley et al. |
| 2005/0217616 A1 | 10/2005 | Po |
| 2005/0217637 A1 | 10/2005 | Hill et al. |
| 2005/0224038 A1 | 10/2005 | Bando |
| 2005/0224605 A1 | 10/2005 | Dingle |
| 2005/0224606 A1 | 10/2005 | Dingle |
| 2005/0230854 A1 | 10/2005 | DeLisle |
| 2005/0274334 A1 | 12/2005 | Warren |
| 2005/0279321 A1 | 12/2005 | Crawford et al. |
| 2005/0284442 A1 | 12/2005 | Stuttaford et al. |
| 2006/0096570 A1 | 5/2006 | Tourteaux et al. |
| 2006/0096571 A1 | 5/2006 | Tourteaux et al. |
| 2006/0144362 A1 | 7/2006 | Robinet et al. |
| 2006/0169241 A1 | 8/2006 | Merritt |
| 2006/0219210 A1 | 10/2006 | Bailey et al. |
| 2006/0225692 A1 | 10/2006 | Lindner et al. |
| 2006/0225693 A1 | 10/2006 | Brachert et al. |
| 2006/0260580 A1 | 11/2006 | Yoshimoto |
| 2006/0260581 A1 | 11/2006 | Yoshimoto |
| 2006/0266325 A1 | 11/2006 | Sergeev |
| 2006/0267469 A1 | 11/2006 | Alger, II et al. |
| 2007/0000465 A1 | 1/2007 | Scarisbrick et al. |
| 2007/0007257 A1 | 1/2007 | Uhm et al. |
| 2007/0023002 A1 | 2/2007 | Alger, II et al. |
| 2007/0044449 A1 | 3/2007 | O'Brien et al. |
| 2007/0051338 A1 | 3/2007 | Merritt |
| 2007/0068466 A1 | 3/2007 | Kulzer |
| 2007/0068475 A1 | 3/2007 | Kopecek et al. |
| 2007/0105928 A1 | 5/2007 | Blasco et al. |
| 2007/0144459 A1 | 6/2007 | Fiveland |
| 2007/0144480 A1 | 6/2007 | Herweg et al. |
| 2007/0235002 A1 | 10/2007 | Blank |
| 2007/0261663 A1 | 11/2007 | Lineton et al. |
| 2007/0272200 A1 | 11/2007 | Kamimura et al. |
| 2008/0017165 A1 | 1/2008 | Schubert |
| 2008/0035105 A1 | 2/2008 | Robinson |
| 2008/0098983 A1 | 5/2008 | Bailey |
| 2008/0168963 A1 | 7/2008 | Gagliano et al. |
| 2008/0196690 A1 | 8/2008 | Hotta et al. |
| 2008/0253738 A1 | 10/2008 | Yamauchi et al. |
| 2008/0272683 A1 | 11/2008 | Boehler et al. |
| 2008/0296294 A1 | 12/2008 | Uhm |
| 2008/0299504 A1 | 12/2008 | Horn |
| 2009/0025673 A1 | 1/2009 | Adams |
| 2009/0078228 A1 | 3/2009 | Tsutsumizaki et al. |
| 2010/0000486 A1 | 1/2010 | Herden et al. |
| 2010/0051724 A1 | 3/2010 | Hicks et al. |
| 2010/0051726 A1 | 3/2010 | Houtman et al. |
| 2010/0065000 A1 | 3/2010 | Herden et al. |
| 2010/0071343 A1 | 3/2010 | Yu |
| 2010/0096037 A1 | 4/2010 | Lee et al. |
| 2010/0126472 A1 | 5/2010 | Shepherd |
| 2010/0132660 A1 | 6/2010 | Nerheim |
| 2010/0147259 A1 | 6/2010 | Kuhnert et al. |
| 2010/0252546 A1 | 10/2010 | Herden et al. |
| 2010/0275868 A1 | 11/2010 | Herden et al. |
| 2010/0282195 A1 | 11/2010 | Herden et al. |
| 2010/0282196 A1 | 11/2010 | Ridderbusch |
| 2010/0296530 A1 | 11/2010 | Herden et al. |
| 2011/0036324 A1 | 2/2011 | de Versterre |
| 2011/0041793 A1 | 2/2011 | Weinrotter et al. |
| 2011/0061623 A1 | 3/2011 | Oledzki |

(56) References Cited

U.S. PATENT DOCUMENTS

| | | |
|---|---|---|
| 2011/0100322 A1 | 5/2011 | Gruber et al. |
| 2011/0146618 A1 | 6/2011 | LaPointe et al. |
| 2011/0297121 A1 | 12/2011 | Kraus et al. |
| 2011/0303185 A1 | 12/2011 | Zajac et al. |
| 2011/0303186 A1 | 12/2011 | Sergeev |
| 2012/0024250 A1 | 2/2012 | Weyl et al. |
| 2012/0060791 A1 | 3/2012 | Woerner et al. |
| 2012/0103302 A1 | 5/2012 | Attard |
| 2012/0210974 A1 | 8/2012 | Adams |
| 2012/0304959 A1 | 12/2012 | Weinrotter et al. |
| 2013/0000597 A1 | 1/2013 | Weinrotter et al. |
| 2014/0360456 A1 | 12/2014 | Gaul et al. |
| 2014/0366551 A1* | 12/2014 | Prociw .................. F23R 3/14 60/776 |
| 2015/0128607 A1 | 5/2015 | Lee |
| 2015/0211742 A1 | 7/2015 | Lee |
| 2015/0240710 A1 | 8/2015 | Thomassin et al. |
| 2015/0260131 A1 | 9/2015 | Riley et al. |

FOREIGN PATENT DOCUMENTS

| | | |
|---|---|---|
| EP | 861369 B1 | 4/2002 |
| EP | 1701017 A1 | 9/2006 |
| EP | 1671019 A4 | 1/2009 |
| EP | 1671018 A4 | 2/2009 |
| EP | 1456530 B1 | 4/2009 |
| EP | 1766208 A4 | 8/2011 |
| EP | 1671018 B1 | 1/2012 |
| EP | 2414660 A1 | 2/2012 |
| EP | 2510222 A1 | 10/2012 |
| EP | 2558709 A1 | 2/2013 |
| EP | 2561214 A2 | 2/2013 |
| EP | 2577042 A1 | 4/2013 |
| EP | 2775117 A3 | 11/2014 |
| EP | 2836690 A1 | 2/2015 |
| EP | 2778367 A3 | 3/2015 |
| EP | 2444621 B1 | 6/2015 |
| EP | 2775125 A3 | 8/2015 |
| EP | 2943666 A1 | 11/2015 |
| FR | 72883 | 7/1960 |
| GB | 856790 | 12/1960 |
| WO | WO9830793 | 7/1998 |
| WO | WO2009040177 A1 | 4/2009 |
| WO | WO2010094551 A1 | 8/2010 |
| WO | WO2011085853 A1 | 7/2011 |
| WO | WO2011138087 A3 | 7/2012 |
| WO | WO2012152462 A1 | 11/2012 |
| WO | WO2012152471 A1 | 11/2012 |
| WO | WO2013041289 A1 | 3/2013 |
| WO | WO2014204449 | 12/2014 |
| WO | WO2015142744 A1 | 9/2015 |
| WO | WO2016025746 A1 | 2/2016 |

OTHER PUBLICATIONS

Chinese Office Action in Chinese Application No. 201580055696.0, dated Nov. 14, 2018, 22 pages with English Translation.

Chinese Office Action in Chinese Application No. 201580055696.0, dated May 24, 2019, 9 pages with English translation.

* cited by examiner

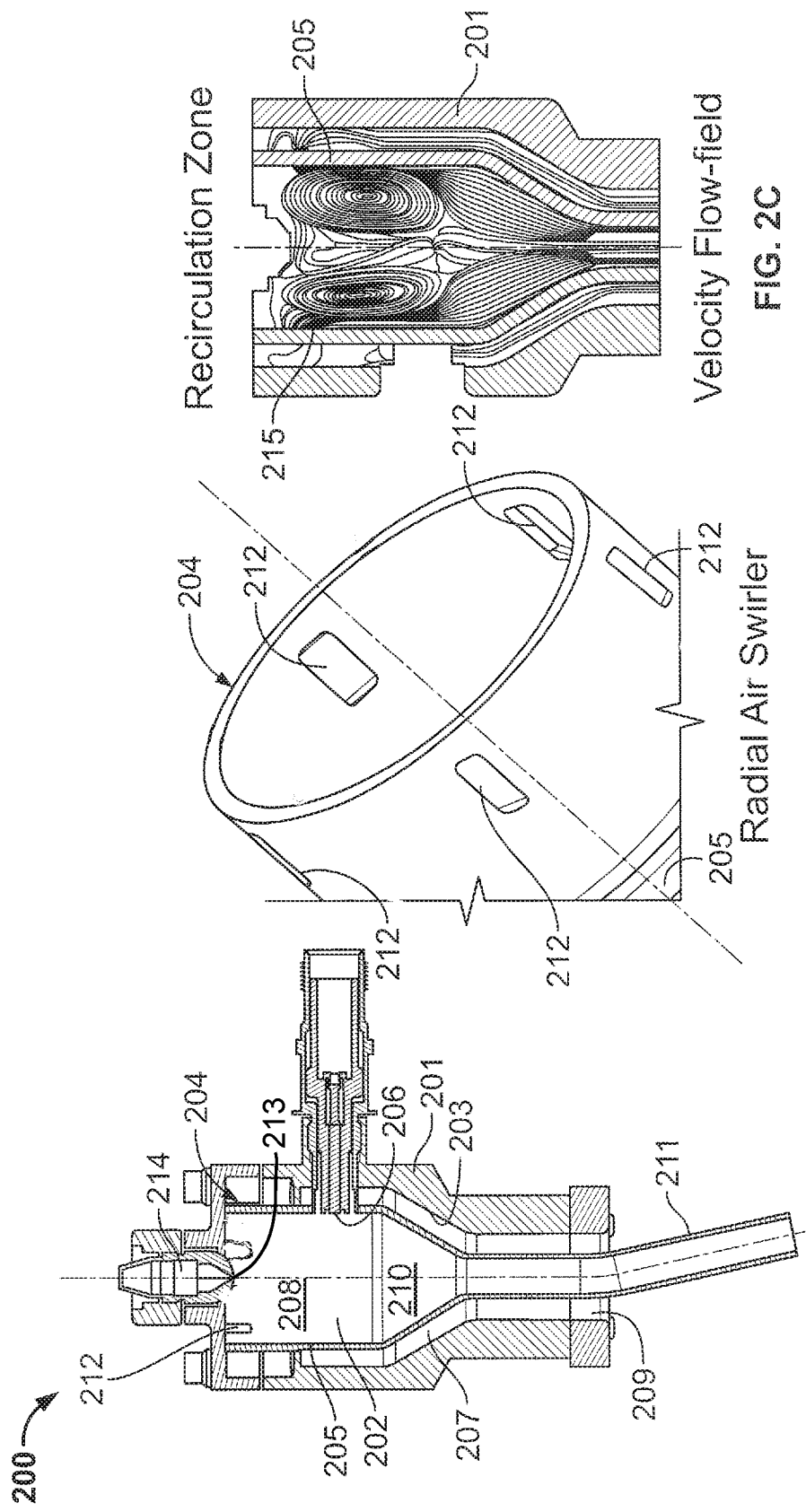

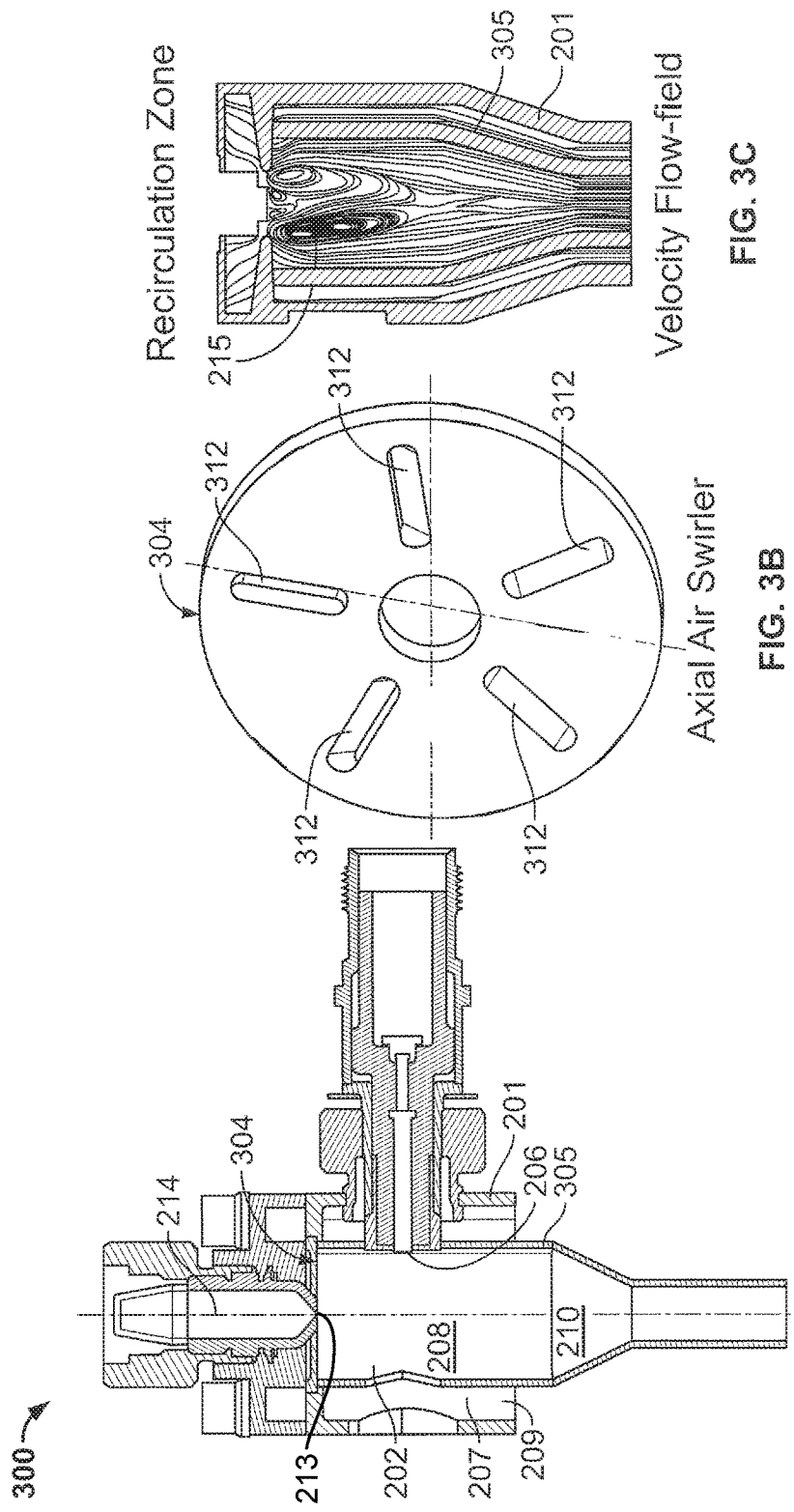

TORCH IGNITER

CROSS-REFERENCE TO RELATED APPLICATIONS

This application claims the benefit of priority to U.S. Provisional Application Ser. No. 62/038,708, filed on Aug. 18, 2014, the contents of which are hereby incorporated by reference.

TECHNICAL FIELD

This specification generally relates to combustor assemblies for gas turbine engines that incorporate auxiliary torch ignition systems to facilitate ignition in a main combustion chamber.

BACKGROUND

The gas turbine engine is the preferred class of internal combustion engine for many high power applications. Fundamentally, the gas turbine engine features an upstream rotating compressor coupled to a downstream turbine, and a combustion chamber in-between. A torch igniter is a device that may be used to ignite the primary combustor of a gas turbine engine. In some applications, the torch igniter has advantages over conventional spark igniters, because it can provide larger amounts of energy release to the main combustor, and thus, is capable of lighting the engine in a more reliable manner. To achieve this, the torch igniter requires an auxiliary source of fuel and air, as well as an ignition source. Auxiliary air flow is typically obtained from the plenum downstream of the engine's compressor; and the auxiliary fuel is obtained from the fuel-metering unit or manifold. Air flow requirements to operate the torch igniter may vary under different conditions, but are typically less than the air flow requirements of the primary combustor. On a typical engine, much like a conventional spark igniter, there can be two torch igniters for redundancy.

BRIEF DESCRIPTION OF THE DRAWINGS

FIG. 2A is a half, side cross-sectional view of a first example torch igniter system.

FIG. 2B is a perspective view of a radial air swirler of the torch igniter system shown in FIG. 2A.

FIG. 2C is a diagram illustrating a velocity flow field achieved by operation of the torch igniter system shown in FIG. 2A.

FIG. 3A is a half, side cross-sectional view of a second example torch igniter system.

FIG. 3B is a perspective view of an axial air swirler of the torch igniter system shown in FIG. 3A.

FIG. 3C is a diagram illustrating a velocity flow field achieved by operation of the torch igniter system shown in FIG. 3A.

DETAILED DESCRIPTION

In a gas turbine engine, the torch igniter ignites fuel released by combustor nozzles in a combustor of the engine to produce heated combustion products. The heated combustion products are, in turn, expanded through a turbine of the engine to produce torque. Reliable ignition and flame propagation around the primary combustor nozzles at lower air pressure drop (delta P), particularly in cold ambient conditions, may require a minimum level of energy provided to the operating envelope. In order to provide energy across a broad range of operating conditions, high-quality flame stability/operability of the torch igniter system is desired. In certain aspects, the present disclosure relates to a torch igniter system that supplies high energy, for example, by incorporating radial and/or axial air swirler components designed to create strong recirculation zone in an auxiliary combustion chamber. In some implementations, optimization of the turbulence and swirling components is achieved to sustain the torch igniter flame without having to keep the ignition source on. In some implementations, a torch igniter in accordance with one or more embodiments of the present disclosure can improve cold day combustor light off performance, and provide reliable re-light capability across a wide range of operating conditions by providing high energy release that is enhanced by swirl stabilized combustion in the torch combustor. In some implementations, a torch igniter in accordance with one or more embodiments may provide a near stoichiometric combustion process inside the torch combustor. Such a combustion process may produce higher gas temperature and trace amounts of chemically active species, which are beneficial for ignition in the primary combustor chamber (e.g., the combustor dome 106). A potential benefit achieved by the near stoichiometric combustion process is improved flame propagation within the primary combustor chamber, and less exhaust smoke during combustor start up periods.

Figure 1:
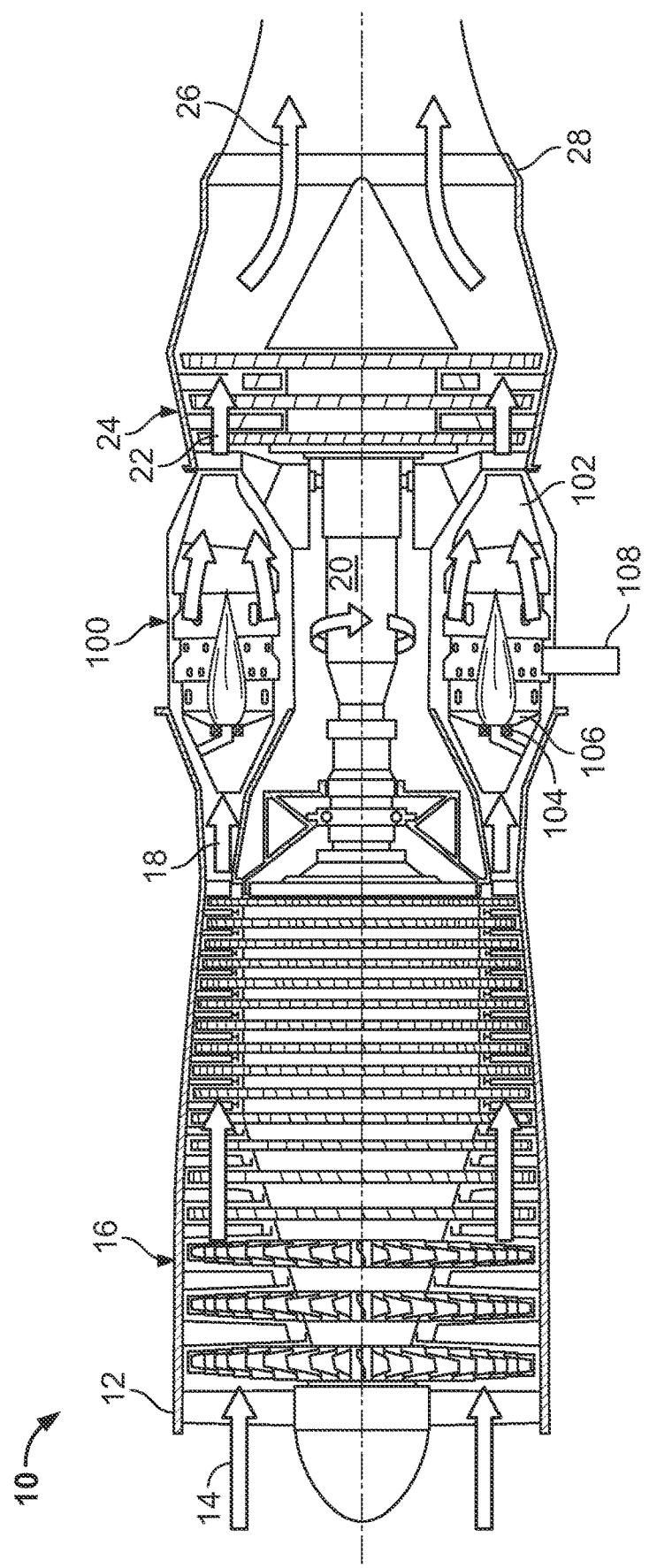
FIG. 1 is a half, side cross-sectional view of an example gas turbine engine.

FIG. 1 is a half, side cross-sectional view of an example gas turbine engine 10. The gas turbine engine 10 is turbojet-type gas turbine that could be used, for example, to power jet aircrafts. However, it is appreciated that the concepts described in the present disclosure are not so limited, and can be incorporated in the design of various other types of gas turbine engines (e.g., turbofan, turboprop, turboshaft, or industrial/marine engines).

As shown, the gas turbine engine 10 generally facilitates a continuous axial flow of gas. That is, gas generally flows through the engine 10 in the axially downstream direction indicated by the arrows in FIG. 1. The gas turbine engine 10 includes an intake 12 that receives ambient air 14 and directs the ambient air to a compressor 16. The ambient air 14 is drawn through multiple stages of the compressor 16. High-pressure air 18 exiting the compressor 16 is introduced to a combustor 100. In certain instances the combustor 100 is an annular combustor circumscribing the engine's main shaft 20 or a can-type combustor positioned radially outward of the shaft.

The combustor 100 includes a combustion shield 102, multiple fuel injectors 104, a combustor dome 106, and a torch igniter system 108. At the combustor 100, the high-pressure air 18 is mixed with liquid hydrocarbon fuel (not shown) and ignited by the torch igniter system 108 to produce heated combustion products 22. The combustion products 22 are passed through multiple stages of a turbine 24. The turbine 24 extracts energy from the high-pressure, high-temperature combustion products 22. Energy extracted from the combustion products 22 by the turbine 24 drives the compressor 16, which is coupled to the turbine by the main shaft 20. Exhaust gas 26 leaving the turbine 24 is accelerated into the atmosphere through an exhaust nozzle 28 to provide thrust or propulsion power.

FIGS. 2A-C shows an example torch igniter 200 that can be used in the torch igniter system 108 of FIG. 1. In certain instances, the torch igniter system 108 includes multiple, spaced apart torch igniters. The torch igniter 200 has an outer housing 201 with an interior chamber 203; the interior chamber 203 is shown in FIG. 1 as being substantially cylindrical. The outer housing 201 internally receives an auxiliary combustion chamber housing 205, defining an annular air passage 207 between them. The auxiliary combustion chamber housing 205 abuts the upper end of the interior chamber 203. The annular air passage 207 includes an inlet 209 open to the primary combustion chamber. The auxiliary combustion chamber housing 205, also shown as being substantially cylindrical in FIG. 1, defines an internal auxiliary combustion chamber 202. A radial air swirler 204, again shown as cylindrical, is coupled to the upper end of auxiliary combustion chamber housing 205. An ignition source 206, such as a spark generating igniter, is provided extending through a sidewall of the auxiliary combustion chamber 202.

The auxiliary combustion chamber housing 205 is shown defining a cylindrical mixing chamber 208 and a necked throat region 210, shown as being conical, converging downstream of the mixing chamber 208 to a nozzle tube 211. The angle of the cone can be different in different in different circumstances. In certain instances, the throat region 210 can converge abruptly, forming a shoulder or step between the larger diameter of the mixing chamber 208 and the smaller diameter of the throat region 210, where the shoulder or step is orthogonal to the longitudinal axis of the auxiliary combustion chamber housing 205. In some embodiments, the ignition source 206 projects radially into the mixing chamber 208 of the auxiliary combustion chamber 202, downstream of the outlet 213 of an auxiliary fuel injector 214. The auxiliary fuel injector 214 is positioned at the top of the auxiliary combustion chamber 202 with its outlet 213 axially oriented to inject fuel coincident with the center axis of the auxiliary combustion chamber 202. The ignition source 206 ignites fuel output from the auxiliary fuel injector 214 in the auxiliary combustion chamber 202 and the converging throat region 210 and nozzle tube 211 nozzle the flow out of the auxiliary combustion chamber 202 to produce a flaming jet in the primary combustion chamber. The resulting flaming jet reaches deep into the primary combustion chamber, and provides a strong (high heat energy), high surface area flame to combust air and fuel mixture in the primary combustion chamber.

The radial air swirler 204 is shown having a plurality of swirl openings 212 that extend through the side wall of the swirler 204, adjacent the upper end of the auxiliary combustion chamber housing 205 and surrounding an outlet 213 of the auxiliary fuel injector 214. The swirl openings 212 of the air swirler 204 fluidly connect the annular air passage 207 with the mixing chamber 208 of the auxiliary combustion chamber 202 to facilitate air flow through the torch igniter 200. The swirl openings 212 are angled, oriented generally radially, along chords across the auxiliary combustion chamber housing 205, to cause air incoming from the annular air passage 207 into the auxiliary combustion chamber 202 to swirl forming a flow vortex along the longitudinal axis of the auxiliary combustion chamber 202. Fewer or more swirl openings 212 than are shown could be provided. In certain instances, the air swirler 204 can have a different diameter than the mixing chamber 208, and can transition from that different diameter in a cone or with an abrupt shoulder or step. For example, a step up in diameter from the air swirler 204 to the mixing chamber 208 can promote turbulence in the areas adjacent the step.

The torch igniter 300 of FIG. 3A-C is similar to torch igniter 200, except that it features an axial air swirler 304. As shown (see FIG. 3B), the axial air swirler 304 is disk-shaped and is coupled to the upper end of the auxiliary combustion chamber housing 305, spaced apart from the upper end of the inner chamber 203. The axial air swirler 304 includes a plurality of swirl openings 312 therethrough, provided in a circumferential pattern, surrounding the outlet 213 of the auxiliary fuel injector 214 and oriented generally axially, at a non-zero angle relative to the longitudinal axis of the auxiliary combustion chamber 202 and auxiliary fuel injector 214. The swirl openings 312 are arranged to form a flow vortex along the longitudinal axis of the auxiliary combustion chamber 202. Fewer or more swirl openings 312 than are shown could be provided. In certain instances, the upper end of the mixing chamber 208 can have a different diameter that the remainder of the mixing chamber 208.

The flow area, orientation and number of swirl openings 212, 312, as well as the shape of the auxiliary combustion chamber 202, is dimensioned, for example iteratively using computational fluid dynamics software, to produce a recirculation zone in the mixing chamber 208 near the outlet 213 of the auxiliary fuel injector 214. The recirculating air/fuel flow 215 is shown by the velocity field flow lines in FIGS. 2C and 3C as being generally toroidal around the outlet 213 of the auxiliary fuel injector 214, flowing downward (away from the outlet 213 of the fuel injector 214) through the center of the auxiliary combustion chamber 202 and upward (back toward the outlet 213 of the fuel injector 214) along the interior sidewalls. The toroidal recirculation 215 extends the entire axial length of the mixing chamber 208, from the top end of the mixing chamber 208 to the bottom end of the mixing chamber 208, near the beginning of the necking of the throat region 210. The necking from the mixing chamber 208 to the throat region 210 contributes to forming the recirculating flow 215, as peripheral flow encountering the necking and reduced flow area is redirected back up the sidewall. The resulting turbulence and recirculation in the recirculation zone sustains combustion of the fuel from the auxiliary fuel injector 214 once ignited by the ignition source 206 without having to maintain the ignition source 206 on, because a portion of the ignited air/fuel is recirculated back into the incoming fuel from the auxiliary fuel injector 214. Moreover, the turbulence and recirculation tends to mix the combusting air/fuel with uncombusted air/fuel, tending to more evenly ignite the air/fuel throughout the auxiliary combustion chamber 202 and produce stronger, higher energy combustion.

In certain instances, if a torch igniter system operates in an intermittent manner (e.g., repeated on/off cycles) and during shut-down, coke formation due to stagnant fuel can restrict the fuel flow passages in the auxiliary fuel injector. This effect can be more pronounced because of the smaller passageways required for lower fuel flow rates. Thus, in some implementations, there is a need to purge or cool the fuel injectors during those times when the torch is off. Some embodiments of a torch igniter system can include be designed to provide purging and cooling of the auxiliary fuel injector with little or no additional hardware.

Figure 4:
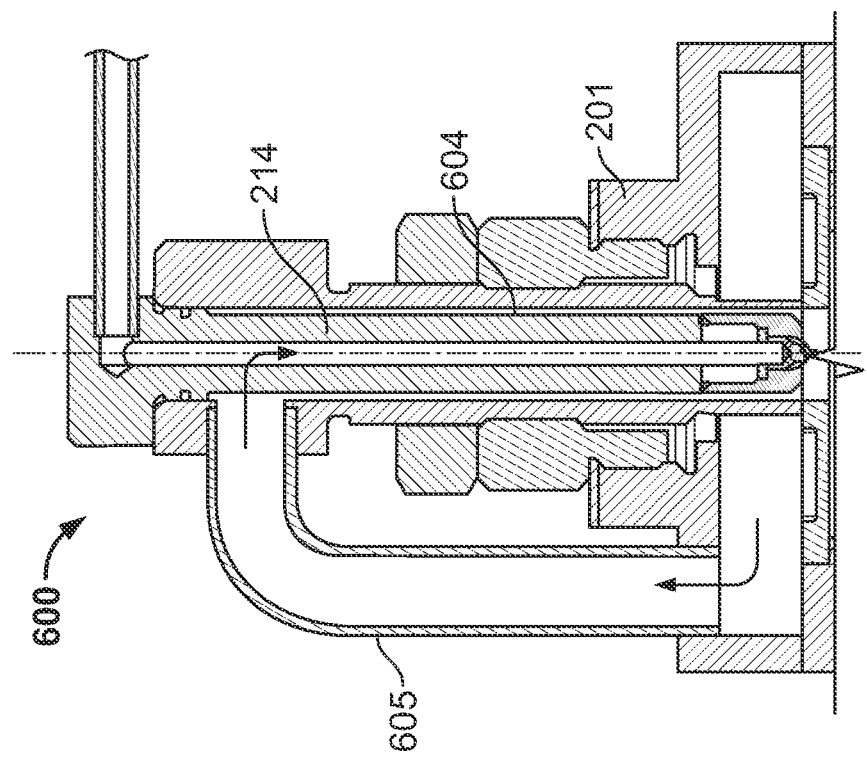
FIG. 4 is a half, side cross-sectional view of a torch igniter system including a cooling air sub-system coupled to the fuel injector.

FIG. 4 is a half, side cross-sectional view of the upper end 600 of a torch igniter, such as torch igniter 200 or 300, including a cooling air sub-system 602 about the auxiliary fuel injector 214. In this embodiment, air from the main compressor of the turbine engine is routed through a passage immersed in relatively cool duct air (i.e., fresh air not sourced from within the engine). The cooled duct air flows into the outer torch igniter housing 201 and through a conduit 603 of the sub-system 602 into an annulus gap 604 between the housing 201 and the auxiliary fuel injector 214, before exiting into the auxiliary combustion chamber 202.

Figure 5:
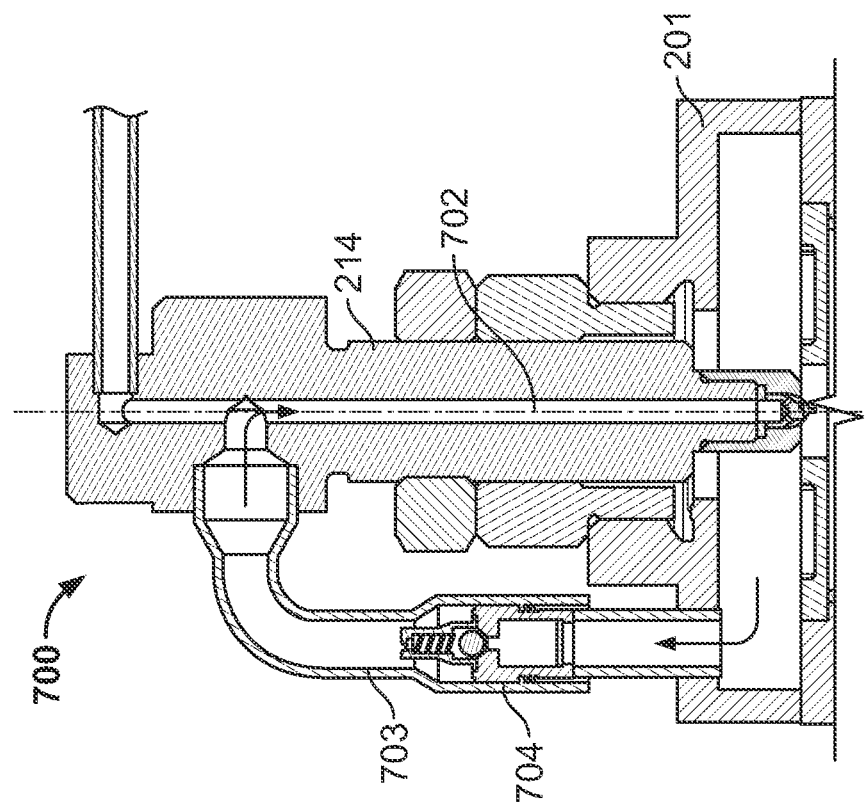
FIG. 5 is a half, side cross-sectional view of a torch igniter system including a cooling air sub-system coupled to the fuel injector.

FIG. 5 is a half, side cross-sectional view of the upper end 700 of a torch igniter, such as torch igniter 200 or 300, including a purge air sub-system coupled to the auxiliary fuel injector 214. In this example, the cooled duct air flows through the conduit 703 into the bore 702 of the auxiliary fuel injector 214. A check valve 704 in the conduit 703 regulates the air flow such, that when fuel pressure is reduced to a specified level (e.g., when the torch igniter system is deactivated), the purge air starts flowing through the fuel circuit due to a net pressure difference.

A number of embodiments of the invention have been described. Nevertheless, it will be understood that various modifications may be made without departing from the spirit and scope of the inventions.

What is claimed is:

1. A gas turbine combustor assembly, comprising:
    a primary combustion chamber in fluid communication with a primary fuel injector and a primary air inlet; and
    a torch igniter carried by the primary combustion chamber, comprising:
        an auxiliary combustion chamber housing comprising a cylindrical mixing chamber and a conical necked throat region, the throat region aligned coaxially with the mixing chamber and converging downstream of the mixing chamber;
        an air swirler comprising a plurality of swirl openings surrounding an outlet of an auxiliary fuel injector coupled to the auxiliary combustion chamber housing proximate the mixing chamber; and
        an ignition source projecting radially through a sidewall of the mixing chamber of the auxiliary combustion chamber housing at a location downstream of the auxiliary fuel injector,
        wherein the mixing chamber and the throat region of the auxiliary combustion chamber housing are configured to create a recirculating flow in an interior of the auxiliary combustion chamber housing, the recirculating flow having a generally toroidal shape around the outlet of the auxiliary fuel injector, flowing away from the auxiliary fuel injector through a central region within the interior of the auxiliary combustion chamber housing and toward the auxiliary fuel injector along the sidewall of the auxiliary combustion chamber housing.

2. The gas turbine combustor assembly of claim 1, wherein the plurality of swirl openings comprises a circumferential pattern of air openings oriented radially relative to the outlet of the auxiliary fuel injector.

3. The gas turbine combustor assembly of claim 1, wherein the plurality of swirl openings comprises a circumferential pattern of air openings oriented axially relative to the outlet of the auxiliary fuel injector.

4. The gas turbine combustor assembly of claim 1, wherein the outlet of the auxiliary fuel injector and the plurality of swirl openings are located upstream of the ignition source.

5. The gas turbine combustion assembly of claim 1, comprising a housing surrounding the auxiliary fuel injector, and an annulus gap between the auxiliary fuel injector and the housing surrounding the auxiliary fuel injector, the annulus gap coupled to a source of air.

6. The gas turbine combustor assembly of claim 1, wherein:
    the torch igniter comprises an outer torch igniter housing coupled to the primary combustion chamber and internally receiving the auxiliary combustion chamber housing, the outer torch igniter housing and the auxiliary combustion chamber housing defining an annular air passage therebetween having an air inlet open to the primary combustion chamber; and
    wherein the plurality of swirl openings fluidly connect the annular air passage and the mixing chamber.

7. The gas turbine combustor assembly of claim 1, further comprising a purge air system, comprising:
    an inlet in fluid communication with a purge air source;
    an outlet in fluid communication with a fuel passage of the auxiliary fuel injector; and
    a purge valve located between the inlet of the purge air system and the outlet of the purge air system, the purge valve comprising an actuator adjustable between a closed condition and an open condition in response to a pressure difference between the purge air source and the fuel passage of the auxiliary fuel injector.

8. The gas turbine combustor assembly of claim 1, where the mixing chamber defines an overall axial length, and where the recirculating flow defines a recirculation zone extending throughout the overall axial length of the mixing chamber.

9. The gas turbine combustor assembly of claim 8, where turbulence associated with the recirculating flow is sufficient to sustain combustion when the ignition source is deactivated.

10. The gas turbine combustor assembly of claim 1, where the recirculating flow defines a recirculation zone extending axially beyond the ignition source.

11. The gas turbine combustor assembly of claim 1, where the ignition source comprises a spark igniter.

12. The gas turbine combustor assembly of claim 1, where the outlet of the auxiliary fuel injector is coincident with a center axis of the auxiliary combustion chamber housing.

13. A gas turbine engine, comprising:
    a compressor configured to compress incoming air;
    the gas turbine combustor assembly according to claim 1, said gas turbine combustor assembly configured to receive fuel and the incoming air from the compressor to produce combustion products;
    a turbine coupled to the gas turbine combustor assembly and configured to extract energy from the combustion products.

14. The gas turbine engine of claim 13, wherein the plurality of swirl openings comprises a circumferential pattern of air openings.

15. The gas turbine engine of claim 13, where the air swirler comprises an axial air swirler.

16. The gas turbine engine of claim 13, where the air swirler comprises a radial air swirler.

* * * * *